(12) United States Patent
Lee

(10) Patent No.: US 9,785,842 B2
(45) Date of Patent: Oct. 10, 2017

(54) SAFETY ALARM SYSTEM AND METHOD FOR VEHICLE

(71) Applicant: Hyundai Mobis Co., Ltd., Yongin-si (KR)

(72) Inventor: Seong soo Lee, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 175 days.

(21) Appl. No.: 14/515,369

(22) Filed: Oct. 15, 2014

(65) Prior Publication Data

US 2015/0103175 A1     Apr. 16, 2015

(30) Foreign Application Priority Data

Oct. 15, 2013  (KR) .................. 10-2013-0122301

(51) Int. Cl.
*G06K 9/00* (2006.01)
*B60R 25/10* (2013.01)

(52) U.S. Cl.
CPC ...... *G06K 9/00791* (2013.01); *B60R 25/1001* (2013.01); *G06K 9/00771* (2013.01)

(58) Field of Classification Search
CPC ............ B60R 25/1001; G06K 9/00771; G06K 9/00791
See application file for complete search history.

(56) References Cited

U.S. PATENT DOCUMENTS

| | | | |
|---|---|---|---|
| 2007/0041659 A1* | 2/2007 | Nobori ................... | B60R 1/00 382/284 |
| 2007/0126564 A1* | 6/2007 | Lee ..................... | B60Q 9/005 340/435 |
| 2007/0188312 A1 | 8/2007 | Bihler et al. | |
| 2009/0033477 A1 | 2/2009 | Illium et al. | |
| 2009/0079553 A1* | 3/2009 | Yanagi ...................... | B60R 1/00 340/435 |
| 2010/0241270 A1* | 9/2010 | Eliuk ........................ | A61J 1/20 700/216 |
| 2012/0065858 A1 | 3/2012 | Nickolaou et al. | |
| 2012/0217764 A1* | 8/2012 | Ishiguro .................... | B60R 1/00 296/1.07 |
| 2013/0004021 A1* | 1/2013 | Nagaoka ................... | B60R 1/00 382/103 |
| 2013/0107053 A1* | 5/2013 | Ozaki ................ | G01C 21/3602 348/148 |

(Continued)

FOREIGN PATENT DOCUMENTS

| | | |
|---|---|---|
| DE | 102004049054 | 4/2006 |
| DE | 102004062459 | 4/2006 |

(Continued)

*Primary Examiner* — Md Haque
(74) *Attorney, Agent, or Firm* — H.C. Park & Associates, PLC

(57) ABSTRACT

A safety alarm system for a vehicle including: a sensor module configured to output an open signal when a vehicle door is opened; an image photographing module configured to output first and second vehicle surrounding image obtained by sequentially photographing a vehicle surrounding area; and a control module configured to detect whether a moving object is located within a predetermined vehicle safety area in the first and second images input by operating the image photographing module at the time of inputting the open signal and generating a safety alarm when the moving object is detected.

17 Claims, 4 Drawing Sheets

(56) References Cited

U.S. PATENT DOCUMENTS

2013/0116859 A1   5/2013  Ihlenburg et al.

FOREIGN PATENT DOCUMENTS

| DE | 102005021142 | 11/2006 |
| --- | --- | --- |
| DE | 102009032444 | 3/2010 |
| EP | 1375267 | 1/2004 |
| JP | 2007-0153193 | 6/2007 |

* cited by examiner

SAFETY ALARM SYSTEM AND METHOD FOR VEHICLE

CROSS-REFERENCE TO RELATED APPLICATION

This application claims priority from and the benefit of Korean Patent Application No. 10-2013-0122301, filed on Oct. 15, 2013, which is hereby incorporated by reference for all purposes as if set forth herein.

BACKGROUND

Field

Exemplary embodiments relate to safety alarm systems and methods for a vehicle, and more particularly, to safety alarm systems and methods for a vehicle capable of easily protecting a driver and passengers by detecting moving objects accessing a vehicle based on vehicle surrounding images obtained by sequentially photographing a vehicle surrounding area to generate a safety alarm.

Discussion of the Background

Generally, in driving a vehicle, when passengers of a vehicle get off the vehicle, the passengers may casually open a door with carelessness while objects coming from behind access the vehicle. Such action may cause a collision with moving objects coming from behind, thereby resulting in damage to the vehicle and the moving objects, and possible injuries to humans.

Therefore, the vehicle uses an ultrasonic sensor to prevent a driver and passengers from colliding with the moving objects accessing the vehicle.

However, because a sensing range of the ultrasonic sensor mounted in a vehicle is limited, there is a need to mount a plurality of ultrasonic sensors in a vehicle in order to increase the sensing range.

Recently, in order to sense the moving objects accessing the vehicle and stably sense the moving objects, studies have been made regarding a vehicle capable of expanding the sensing range.

The above information disclosed in this Background section is only for enhancement of understanding of the background of the invention and, therefore, it may contain information that does not constitute prior art.

SUMMARY

Exemplary embodiments of the present invention provide a safety alarm system and method for a vehicle capable of easily protecting a driver and passengers by detecting moving objects accessing a vehicle based on vehicle surrounding images obtained by sequentially photographing a vehicle surrounding area to generate a safety alarm.

Additional features of the invention will be set forth in the description which follows, and in part will be apparent from the description, or may be learned by practice of the invention.

An exemplary embodiment of the present invention discloses a safety alarm system for a vehicle, including: a sensor module configured to output an open signal when a vehicle door is opened; an image photographing module configured to output first and second vehicle surrounding images obtained by sequentially photographing a vehicle surrounding area; and a control module configured to detect whether a moving object is located within a predetermined vehicle safety area in the first and second images input by operating the image photographing module at the time of inputting the open signal and generating a safety alarm when the moving object is detected.

Another exemplary embodiment of the present invention discloses a safety alarm system for a vehicle, including: a sensor module configured to output an open signal when a vehicle door is opened; an image photographing module configured to output first and second vehicle surrounding images obtained by sequentially photographing a vehicle surrounding area; and a control module configured to detect whether a moving object is located within a predetermined vehicle safety area in the first and second images input by operating the image photographing module at the time of inputting the open signal, calculating an access direction of the moving object when the moving object is detected, and generating a safety alarm if it is determined that the moving object accesses the vehicle.

Another exemplary embodiment of the present invention discloses a safety alarm method for a vehicle, including: receiving an open signal for an open of a vehicle door from a sensor module; sequentially receiving first and second vehicle surrounding images obtained by sequentially photographing a vehicle surrounding area by operating an image photographing module; determining whether a moving object is located within a predetermined vehicle safety area by performing image processing on the first and second vehicle surrounding images; calculating an access direction of the moving object when the moving object is located within the vehicle safety area; determining whether the moving object accesses the vehicle within a predetermined distance; and generating a safety alarm when the moving object accesses the vehicle within the predetermined distance.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
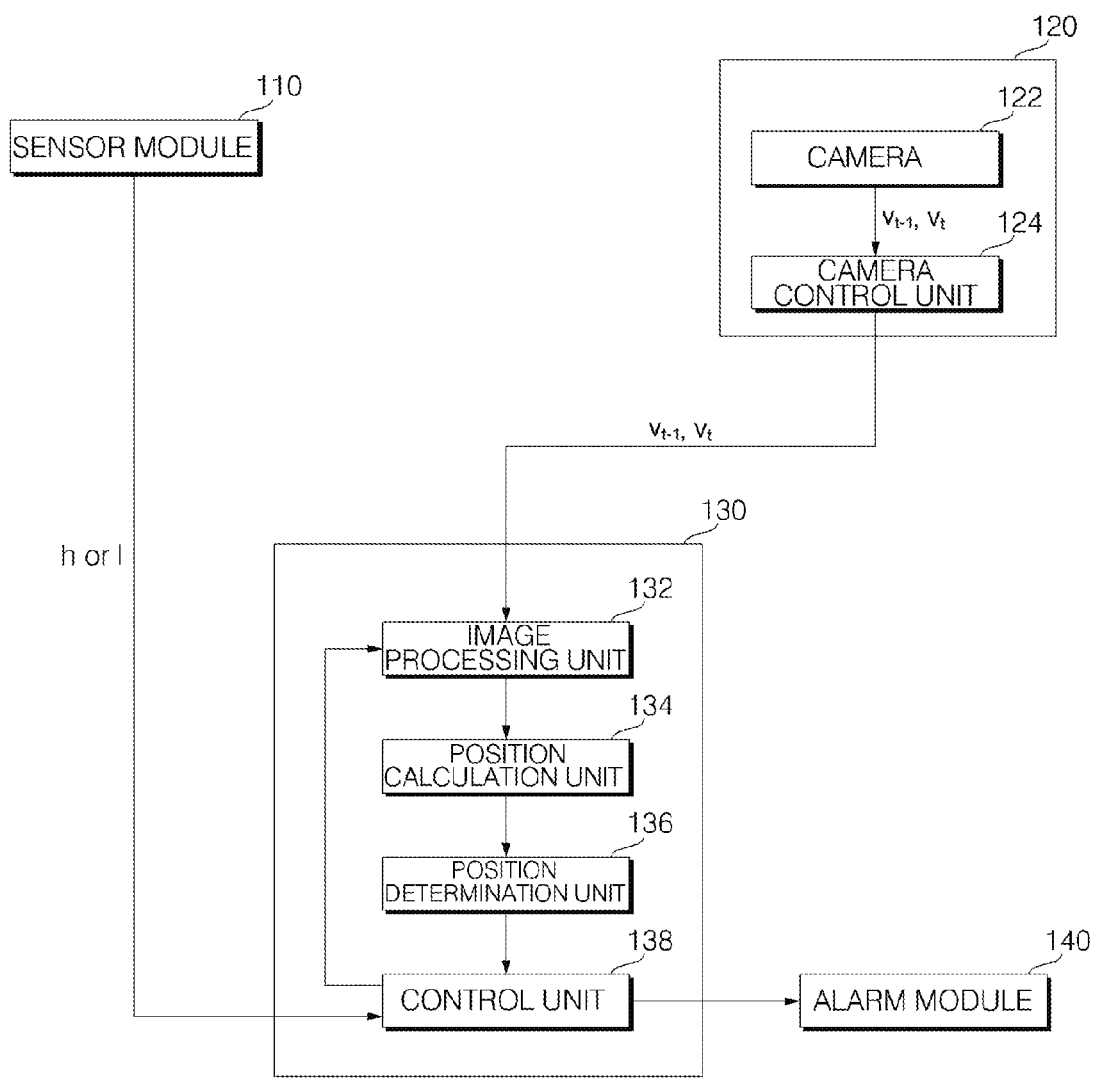
FIG. 1 is a control block diagram illustrating a safety alarm system for a vehicle according to a first exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

Various advantages and features of the present invention and methods accomplishing thereof will become apparent from the following description of embodiments with reference to the accompanying drawings. However, the present invention is not be limited to the embodiments set forth herein but may be implemented in many different forms. The present embodiments may be provided so that the disclosure of the present invention will be complete, and will fully convey the scope of the invention to those skilled in the art and therefore the present invention will be defined within the scope of claims. Like reference numerals throughout the description denote like elements.

Unless defined otherwise, it is to be understood that all the terms (including technical and scientific terms) used in the specification has the same meaning as those that are understood by those who skilled in the art. Further, the terms defined by the dictionary generally used should not be ideally or excessively formally defined unless clearly defined specifically. It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

Hereinafter, exemplary embodiments of the present invention will be described in more detail with reference to the accompanying drawings.

FIG. 1 is a control block diagram illustrating a safety alarm system for a vehicle according to a first exemplary embodiment of the present invention.

Referring to FIG. 1, a safety alarm system for a vehicle may include a sensor module 110, an image photographing module 120, a control module 130, and an alarm module 140.

The sensor module 110 may sense whether a vehicle door (not illustrated) is opened.

That is, the sensor module 110 may output an open signal "h" having a high level when the vehicle door is opened, and output a non-open signal "I" of a low level when the vehicle door is not opened.

In this configuration, the sensor module 110 may include at least one door sensing sensor (not shown) which senses whether the vehicle door is opened.

The vehicle door may be used for entry to and exit from a back seat of a vehicle, that is, either left or right back seats, but is not limited thereto.

The image photographing module 120 may include at least one camera 122 and a camera control unit 124.

According to the present exemplary embodiment, at least one camera 122 may have different photographing areas and angles based on a vehicle, but is not limited thereto.

That is, at least one camera 122 may photograph a vehicle surrounding area, which may include at least one of a vehicle rear area, first and second vehicle side areas, and a vehicle front area.

The vehicle surrounding area may include the circumferential area spaced by a predetermined distance based on one side of a vehicle, and also include the vehicle rear area and the vehicle rear side area, but is not limited thereto.

In this case, at least one camera 122 may output first and second vehicle surrounding images $v_{t-1}$ and $v_t$ obtained by sequentially photographing the vehicle surrounding area according to the control of the camera control unit 124.

The first vehicle surrounding image $v_{t-1}$ is an image photographed at a timing prior to the timing of the second vehicle surrounding image $v_t$, and the second vehicle surrounding image $v_t$ is an image photographed at the present timing.

The image photographing module 120 may be a camera system or an AVM system mounted in a vehicle.

The control module 130 may include an image processing unit 132, a position calculation unit 134, a position determination unit 136, and a control unit 138.

The image processing unit 132 performs image processing on the first and second vehicle surrounding images $v_{t-1}$ and $v_t$, which are sequentially input from the image photographing module 120, to detect any moving object whose image coordinates are changed.

That is, when the second vehicle surrounding image $v_t$ is input, the image processing unit 132 compares the second vehicle surrounding image $v_t$ with a previously input first vehicle surrounding image $v_{t-1}$ to be able to detect the moving objects whose image coordinates are changed.

In more detail, the image processing unit 132 compares the first vehicle surrounding image $v_{t-1}$ with the second vehicle surrounding image $v_t$ to acquire a temporary moving object whose image coordinates are changed, and converts the second vehicle surrounding image $v_t$ into a gray image to be able to define and detect the temporary moving object as the moving object, based on brightness values of each of the plurality of pixels representing the temporary moving object.

Here, the gray image may be detected by converting brightness values of pixels representing an image for a portion excluding the temporary moving objects from the second vehicle surrounding image $v_t$ to 0, representing the temporary moving object according to the brightness values of the pixels, and defining the temporary moving object as the moving object when the brightness values of the pixels of the temporary moving object are all equal to or greater than a predetermined value.

Next, the position calculation unit 134 may calculate a position of the moving object in the second vehicle surrounding image $v_t$.

The position calculation unit 134 may calculate an actual position, including a spaced distance between the moving object and the vehicle, based on image coordinates of the moving object included in the second vehicle surrounding image $v_t$ and a photographing angle of the image photographing module 120.

The position determination unit 136 may determine whether the moving object is located within a predetermined vehicle safety area based on the position of the moving object calculated by the position calculation unit 134.

In the exemplary embodiment, the vehicle safety area is an area based on the vehicle door and is set to be a wider area than a radius of the vehicle door when the vehicle door is completely open, for example.

The control unit 138 may perform a control to operate the sensor module 110 and the image photographing module 120 when a vehicle speed is reduced to a predetermined reference speed.

That is, the control unit 138 determines that the vehicle may be in a stopped state when the vehicle speed is reduced to the reference speed, thereby operating the sensor module 110 and the image photographing module 120.

Next, when the vehicle speed is less than the reference speed to make the vehicle stop and the open signal h is input from the sensor module 110, the control unit 138 may control the image processing unit 132 to detect the moving object based on the second vehicle surrounding image $v_t$ input from the image photographing module 120 and the previously input first vehicle surrounding image $v_{t-1}$.

As the determination result of the position determination unit 136, when the moving object is located within the vehicle safety area, the control unit 138 may perform a control to the alarm module 140 to display an alarm sound or an alarm image corresponding to a safety alarm.

The alarm module 140 may display the first and second surrounding images $v_{t-1}$ and $v_t$, which are photographed by the image photographing module 120, and the alarm image and may generate the alarm sound depending on the control of the control unit 138.

Figure 2:
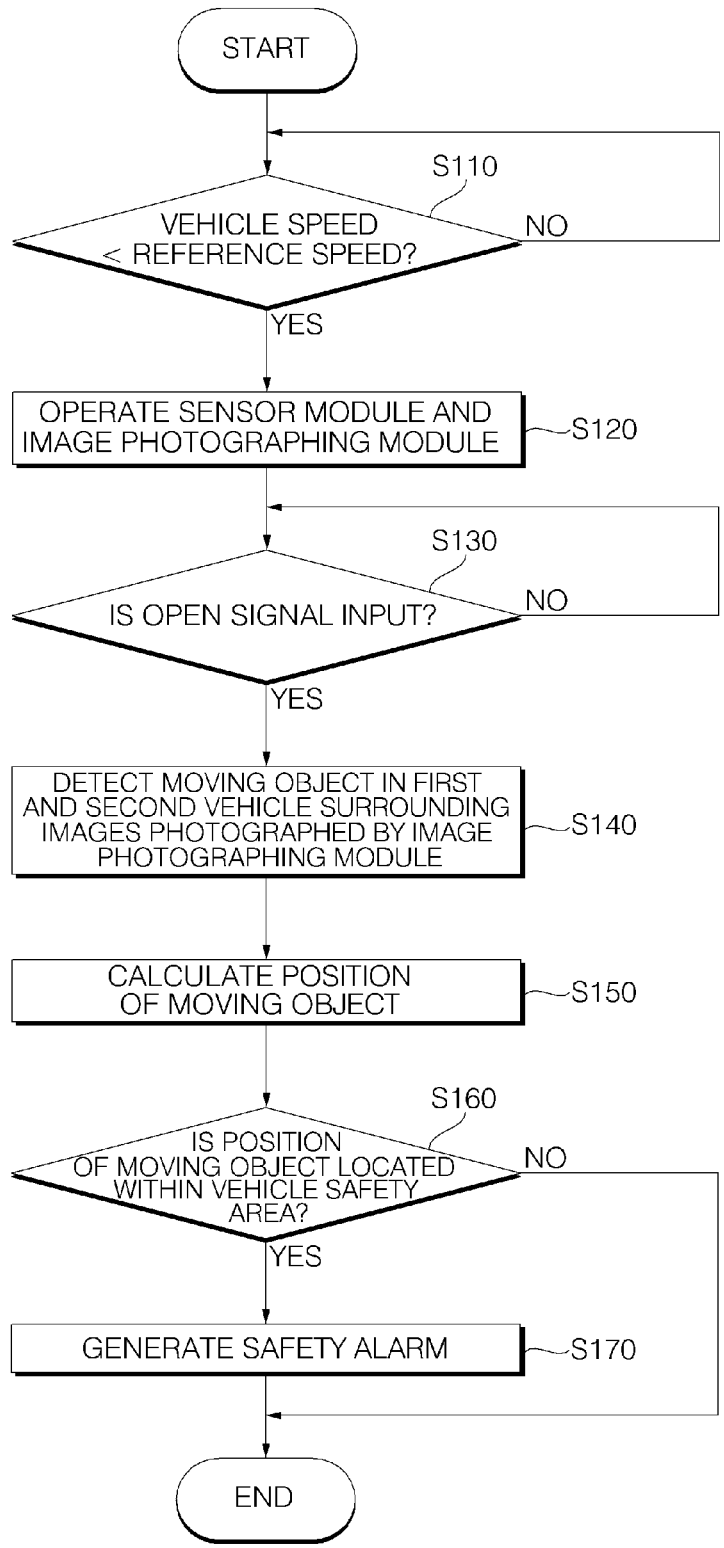
FIG. 2 is a flow chart illustrating a safety alarm method for a vehicle according to a first exemplary embodiment of the present invention.

FIG. 2 is a flow chart illustrating a safety alarm method for a vehicle according to a first exemplary embodiment of the present invention.

Referring to FIG. 2, the safety alarm system for a vehicle determines whether the vehicle speed is less than the predetermined reference speed (S110) and, if it is determined that the vehicle speed is lower than the reference speed, performs a control to operate at least one of the sensor module 110 and the image photographing module 120 (S120).

Next, the safety alarm system for a vehicle determines whether the open signal h for the open of the vehicle door is input from the sensor module 110 (S130).

The safety alarm system for a vehicle performs the image processing on the second vehicle surrounding image $v_t$ currently input from the image photographing module 120 and the first vehicle surrounding image $v_{t-1}$ previously input therefrom when the open signal h is input to detect moving objects (S140).

The safety alarm system for a vehicle calculates the position of the moving object based on the image coordinates of the moving object in the second vehicle surrounding image $v_t$ when the moving object is detected (S150).

The safety alarm system for a vehicle determines whether the calculated position of the moving object is within the predetermined vehicle safety area (S160).

If it is determined that the moving object is located within the vehicle safety area, the safety alarm system for a vehicle controls the alarm module 140 to generate a safety alarm (S170).

If it is determined that the moving object is not located in the vehicle safety area, the safety alarm system for a vehicle either returns to step S150 or ends.

Figure 3:
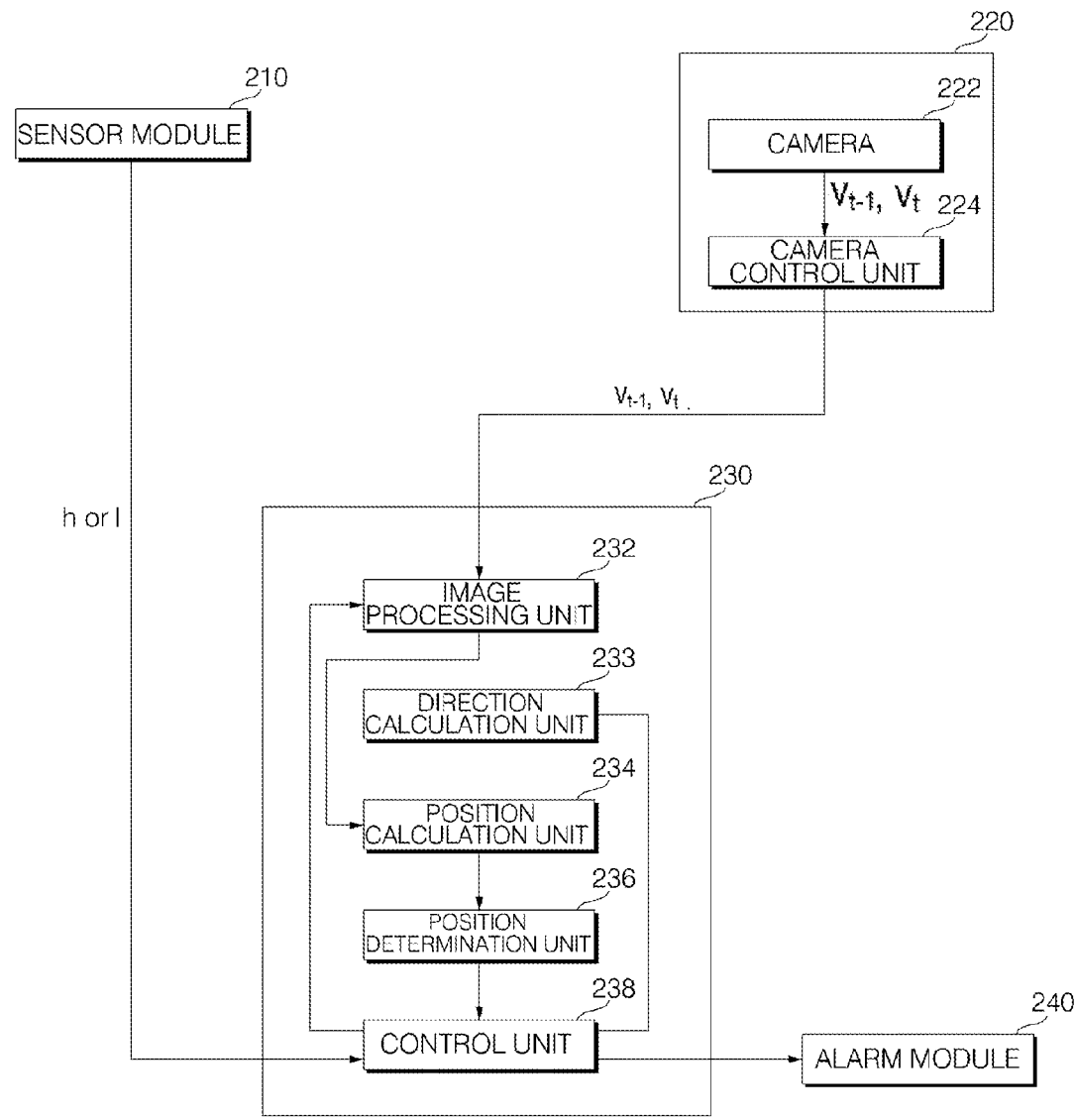
FIG. 3 is a control block diagram illustrating a safety alarm system for a vehicle according to a second exemplary embodiment of the present invention.

FIG. 3 is a control block diagram illustrating a safety alarm system for a vehicle according to a second exemplary embodiment of the present invention.

Referring to FIG. 3, the safety alarm system for a vehicle may include a sensor module 210, an image photographing module 220, a control module 230, and an alarm module 240.

The sensor module 210 may sense whether a vehicle door (not illustrated) is opened.

That is, the sensor module 210 may output an open signal "h" having a high level when the vehicle door is opened and output a non-open signal "l" of a low level when the vehicle door is not opened.

In this configuration, the sensor module 210 may include at least one door sensing sensor that senses whether the vehicle door is opened.

The vehicle door may be used for entry to and exit from a back seat of a vehicle, that is, either left or right back seats, but is not limited thereto.

The image photographing module 220 may include at least one camera 222 and a camera control unit 224.

At least one camera 222 may have different photographing areas and angles based on a vehicle.

That is, at least one camera 222 may photograph a vehicle surrounding area, which may include at least one of a vehicle rear area, first and second vehicle side areas, and a vehicle front area.

The vehicle surrounding area may be a circumferential area spaced by a predetermined distance based on one side of a vehicle, and may include the vehicle rear area and the vehicle rear side, area but is not limited thereto.

In this case, at least one camera 222 may output first and second vehicle surrounding images $v_{t-1}$ and $v_t$ obtained by sequentially photographing the vehicle surrounding area according to a control of the camera control unit 224.

According to the exemplary embodiment, the first vehicle surrounding image $v_{t-1}$ is an image photographed at a timing prior to the second vehicle surrounding image $v_t$, and the second vehicle surrounding image $v_t$ is an image photographed at the present timing.

According to the exemplary embodiment of the present invention, the image photographing module 220 may be a camera system or an AVM system, either of which may be mounted in a vehicle.

The control module 230 may include an image processing unit 232, a direction calculation unit 233, a position calculation unit 234, a position determination unit 236, and a control unit 238.

The image processing unit 232 performs image processing on the first and second vehicle surrounding images $v_{t-1}$ and $v_t$ sequentially input from the image photographing module 220 to detect any moving object whose image coordinates are changed.

That is, when the second vehicle surrounding image $v_t$ is input, the image processing unit 232 compares the second vehicle surrounding image $v_t$ with a previously input first vehicle surrounding image $v_{t-1}$ so as to detect the moving objects whose the image coordinates are changed.

In more detail, the image processing unit 232 compares the first vehicle surrounding image $v_{t-1}$ with the second vehicle surrounding image $v_t$ to acquire a temporary moving object whose image coordinates are changed, and converts the second vehicle surrounding image $v_t$ into the gray image to be able to be able to define and detect the temporary moving object as the moving object based on the brightness values of each of the plurality of pixels representing the temporary moving object.

Here, the gray image may be detected by converting brightness values of pixels representing an image for a portion excluding the temporary moving objects from the second vehicle surrounding image $v_t$ to 0, representing the temporary moving object according to the brightness value of the pixels, and defining the temporary moving object as the moving object when the brightness values of the pixels of the temporary moving object are all equal to or greater than a predetermined value.

When the moving object is detected, the direction calculation unit 233 may calculate an access direction of the moving object based on the image coordinates corresponding to the moving object.

The direction calculation unit 233 may extract feature points of the moving objects detected in the first and second vehicle surrounding images $v_{t-1}$ and $v_t$, and calculate the access direction in which the moving object accesses the vehicle along the moving direction of the feature points.

Next, the position calculation unit 234 may calculate a position of the moving object in the second vehicle surrounding image $v_t$.

The position calculation unit 234 may calculate an actual position including a spaced distance between the moving object and the vehicle based on image coordinates of the moving object included in the second vehicle surrounding image $v_t$ and a photographing angle of the image photographing module 220.

The position determination unit 234 may determine whether the moving object is located within a vehicle safety area in which the moving object is located based on the position of the moving object calculated by the position calculation unit 236.

In the exemplary embodiment, the vehicle safety area is a predetermined area based on the vehicle door, and may be set to be a wider area than a radius of the vehicle door when the vehicle door is opened.

The control unit 238 may perform a control to operate the sensor module 210 and the image photographing module 220 when a vehicle speed is reduced to a predetermined reference speed.

That is, the control unit 238 determines that the vehicle may be in a stopped state when the vehicle speed is reduced to the reference speed, thereby operating the sensor module 210 and the image photographing module 220.

Next, when the vehicle speed is lower than the reference speed to place the vehicle in a stopped state, and the open signal h is input from the sensor module 210, the control unit 238 may control the image processing unit 232 to detect the moving object based on the second vehicle surrounding image vt input from the image photographing module 220 and the previously input first vehicle surrounding image $v_{t-1}$.

As the determination result of the position determination unit 236, when the moving object is located within the vehicle safety area, the control unit 238 may determine whether the moving object accesses the vehicle based on the access direction of the moving object.

Here, when the moving object accesses the vehicle within the predetermined spaced distance, the control unit 238 determines that the moving object accesses the vehicle, the spaced distance may be 1 m to 2 m from one side of the vehicle.

That is, when the spaced distance is less than 1 m, an action of a driver or passengers may be too late at the time of opening of the vehicle door, thereby increasing the probability of accidents, and when the spaced distance is greater than 2 m, the probability of accidents of a driver or passengers even at the time of opening the vehicle door may be rare.

Next, if it is determined that the moving object accesses a vehicle, the control unit 238 may control the alarm module 240 to display the alarm sound or the alarm image corresponding to the safety alarm.

The alarm module 240 may display the first and second surrounding images $v_{t-1}$ and $v_t$, which are photographed by the image photographing module 220, and the alarm image and may generate the alarm sound depending on the control of the control unit 238.

Figure 4:
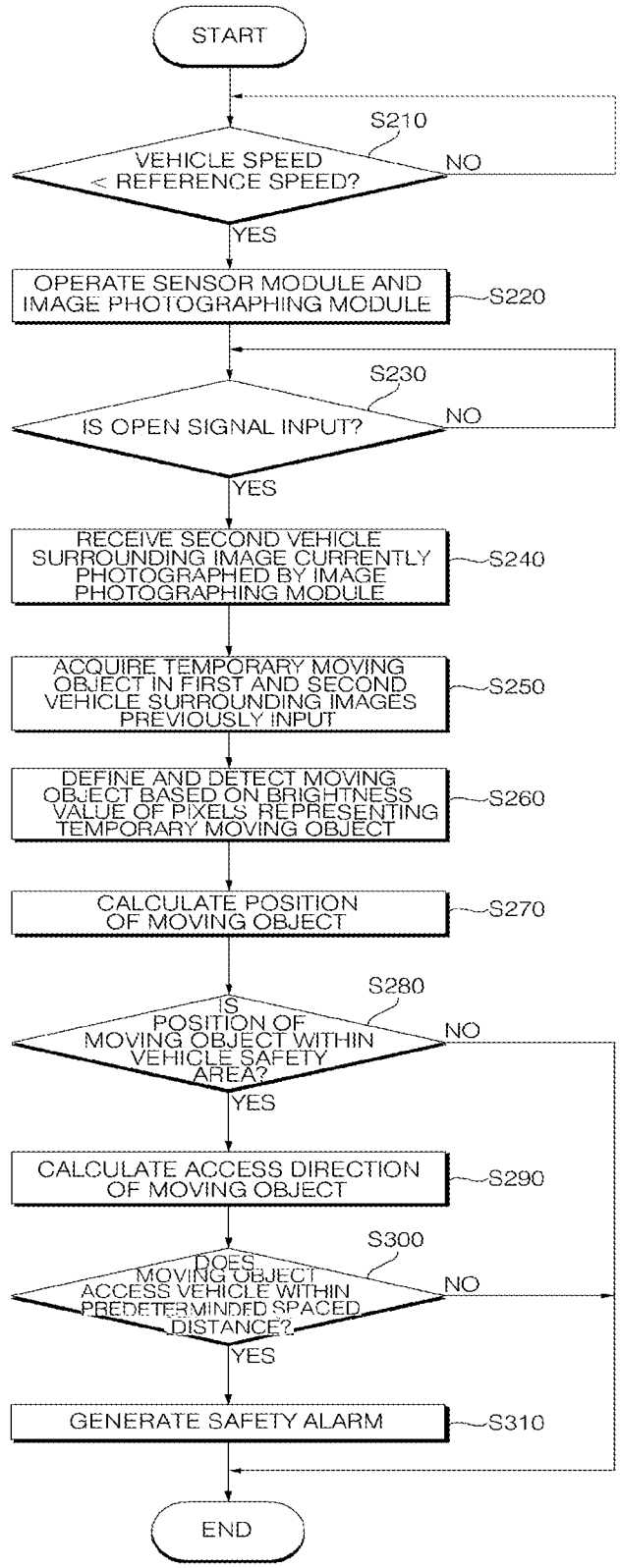
FIG. 4 is a flow chart illustrating a safety alarm method for a vehicle according to a second exemplary embodiment of the present invention.

FIG. 4 is a flow chart illustrating a safety alarm method for a vehicle according to a second exemplary embodiment of the present invention.

Referring to FIG. 4, the safety alarm system for a vehicle determines whether the vehicle speed is lower than the predetermined reference speed (S210), and if it is determined that the vehicle speed is lower than the reference speed, performs a control to operate at least one of the sensor module 210 and the image photographing module 220 (S220).

The safety alarm system for a vehicle determines whether the open signal h for the open of the vehicle door is input from the sensor module 210 (S230).

When the open signal h is input, the safety alarm system for a vehicle receives the second vehicle surrounding image $v_t$ currently input from the image photographing module 220 (S240), acquires the temporary moving object, of which the image coordinates are changed, by performing the image processing on the second vehicle surrounding image $v_t$ and the previously input vehicle surrounding image $v_{t-1}$ (S250), and converts the second vehicle surrounding image $v_t$ into the gray image to be able to define and detect the temporary moving object as the moving object based on the brightness values of each of the plurality of pixels representing the temporary moving object.

The safety alarm system for a vehicle calculates the position of the moving object by converting the image coordinates of the moving object in the second vehicle surrounding image $v_t$ into the set coordinate system (S270).

The safety alarm system for a vehicle determines whether the moving object is located within the vehicle safety area (S280).

When the moving object is determined to be located within the vehicle safety area, the safety alarm system for a vehicle calculates the access direction of the moving object (S290), determines whether the moving object accesses the vehicle within the predetermined spaced distance (S300), and if it is determined that the moving object accesses the vehicle within the predetermined spaced distance, controls the alarm module 240 to generate the safety alarm (S310).

The safety alarm system and method for a vehicle according to the exemplary embodiments of the present invention senses the moving object located in the predetermined vehicle safety area of the vehicle using the image photographing module at the time of opening the vehicle door, thereby expanding the range in which the moving object may be sensed.

The safety alarm system and method for a vehicle according to the exemplary embodiments of the present invention calculates the moving direction of the moving object at the time of sensing the moving objects to determine whether the moving object accesses the vehicle and generate the safety alarm based on the determination result, thereby reducing the false alarm.

Although exemplary embodiments of the present disclosure have been shown and described hereinabove, the present disclosure is not limited to specific exemplary embodiments described above, but may be various modified by those skilled in the art to which the present disclosure pertains without departing from the scope and spirit of the disclosure as disclosed in the accompanying claims. In addition, such modifications should also be understood to fall within the scope and spirit of the present disclosure.

What is claimed is:

1. A safety alarm system for a vehicle, comprising:
   a sensor device configured to output an open signal when a vehicle door is opened;
   an image photographing apparatus configured to output first and second vehicle surrounding images obtained by sequentially photographing a vehicle surrounding area; and
   a main controller configured to detect whether a moving object is located within a predetermined vehicle safety area in the first and second images input by operating the image photographing apparatus at the time of inputting the open signal after the vehicle is stopped, calculating an access direction of the moving object when the moving object is detected, and generating a safety alarm if it is determined that the moving object accesses the vehicle, wherein:

in the calculating, feature points of the moving object detected in the first and second vehicle surrounding images are extracted and the access direction of the moving object along a moving direction of the feature points is calculated; and the main controller comprises:

an image processor configured to perform image processing on the first and second vehicle surrounding images to detect the moving object of which the image coordinates are changed;

a position calculator configured to calculate a position of the moving object in the second vehicle surrounding image;

a position determiner configured to determine whether the moving object is located within the vehicle safety area based on the calculated position of the moving object; and a secondary controller configured to operate the image photographing apparatus when the open signal is input and generate a safety alarm when the moving object is determined to be located within the vehicle safety area.

2. The safety alarm system of claim 1, wherein:

the first vehicle surrounding image is an image of the vehicle surrounding area photographed at a previous time point; and the second vehicle surrounding image is an image of the vehicle surrounding area photographed at a present time point occurring after the previous time point.

3. The safety alarm system of claim 1, wherein the vehicle surrounding area comprises at least one of a vehicle rear area, first and second vehicle side areas, and a vehicle front area.

4. The safety alarm system of claim 1, wherein the sensor device comprises:

a door sensing sensor configured to output the open signal having a high level when the vehicle door is opened, and output a non-open signal having a low level when the vehicle door is not opened.

5. The safety alarm system of claim 1, wherein the image photographing apparatus comprises:

at least one camera configured to photograph the first and second vehicle surrounding images; and a camera controller configured to operate the at least one camera according to a control of the main controller.

6. The safety alarm system of claim 5, wherein the image photographing apparatus further comprises a display unit configured to display the second vehicle surrounding image and an alarm image corresponding to the safety alarm.

7. The safety alarm system of claim 1, wherein the image processor compares the first and second vehicle surrounding images to acquire a temporary moving object of which the image coordinates are changed, and converts the second vehicle surrounding image to a gray image to define and detect the temporary moving object as the moving object based on brightness values of each of the plurality of pixels representing the temporary moving object.

8. The safety alarm system of claim 1, wherein the position calculator converts image coordinates of the moving object in the second vehicle surrounding image into a set coordinate system to calculate the position of the moving object.

9. The safety alarm system of claim 1, further comprising an alarm configured to generate an alarm sound corresponding to the safety alarm according to a control of the control module.

10. A safety alarm system for a vehicle, comprising:

a sensor device configured to output an open signal when a vehicle door is opened;

an image photographing apparatus configured to output first and second vehicle surrounding image obtained by sequentially photographing a vehicle surrounding area; and a main controller configured to detect whether a moving object is located within a predetermined vehicle safety area in the first and second images input by operating the image photographing apparatus at the time of inputting the open signal, calculating an access direction of the moving object when the moving object is detected, and generating a safety alarm if it is determined that the moving object accesses the vehicle, wherein:

in the calculating, feature points of the moving object detected in the first and second vehicle surrounding images are extracted and the access direction of the moving object along a moving direction of the feature points is calculated; and the main controller comprises:

an image processor configured to perform image processing on the first and second vehicle surrounding images to detect the moving object of which the image coordinates are changed;

a direction calculator configured to calculate the access direction of the moving object based on image coordinates corresponding to the moving object when the moving object is detected;

a position calculator configured to calculate a position of the moving object in the second vehicle surrounding image;

a position determiner configured to determine whether the moving object is located within the vehicle safety area based on the position of the moving object; and a secondary controller configured to perform a control to operate the image photographing apparatus when the open signal is input and a control to generate the safety alarm if it is determined that the moving object accesses the vehicle based on the access direction of the moving object when the moving object is located within the predetermined vehicle safety area.

11. The safety alarm system of claim 10, wherein the image processor compares the first and second vehicle surrounding images to acquire a temporary moving object of which the image coordinates are changed and converts the second vehicle surrounding image into a gray image to define and detect the temporary moving object as the moving object based on brightness values of each of the plurality of pixels representing the temporary moving object.

12. The safety alarm system of claim 10, wherein the direction calculator extracts the feature points of the moving objects detected in the first and second vehicle surrounding images and calculates the access direction of the moving objects along a moving direction of the feature points.

13. The safety alarm system of claim 10, wherein the main controller determines that the moving object accesses the vehicle when the moving object accesses the vehicle within a predetermined spaced distance.

14. The safety alarm system of claim 13, wherein the spaced distance is in a range of about 1 m to 2 m from one side of the vehicle.

15. A safety alarm method for a vehicle, comprising:
receiving an open signal for an opening of a vehicle door from a sensor device;
sequentially receiving first and second vehicle surrounding images obtained by sequentially photographing a vehicle surrounding area by operating an image photographing apparatus;
determining whether a moving object is located within a predetermined vehicle safety area by performing image processing on the first and second vehicle surrounding images;
calculating an access direction of the moving object when the moving object is located within the vehicle safety area;
determining whether the moving object accesses the vehicle within a predetermined spaced distance; and
generating a safety alarm when the moving object accesses the vehicle within the spaced distance,
wherein:
in the calculating, feature points of the moving object detected in the first and second vehicle surrounding images are extracted and the access direction of the moving object along a moving direction of the feature points is calculated, and a position of the moving object in the second vehicle surrounding image is calculated;
in the determining whether a moving object is located within a predetermined vehicle safety area, the image processing is performed on the first and second vehicle surrounding images to detect the moving object of which the image coordinates are changed and whether the moving object is located within the vehicle safety area based on the calculated position of the moving object; and
in the generating, the image photographing apparatus is operated when the open signal is input and a safety alarm is generated when the moving object is determined to be located within the vehicle safety area.

16. The safety alarm method of claim 15, wherein the determining whether a moving object is located within a predetermined vehicle safety area comprises:
comparing the first and second vehicle surrounding images to acquire a temporary moving object of which the image coordinates are changed, and converting the second vehicle surrounding image into a gray image to define and detect the temporary moving object as the moving object based on brightness values of each of the plurality of pixels configuring the temporary moving object; and
converting image coordinates of the moving object in the second vehicle surrounding image into a set coordinate system to calculate the position of the moving object and determine whether the moving object is located within the vehicle safety area.

17. The safety alarm method of claim 15, wherein the spaced distance is in a range of about 1 m to 2 m from one side of the vehicle.

* * * * *